US009080222B2

(12) United States Patent
Lengauer et al.

(10) Patent No.: US 9,080,222 B2
(45) Date of Patent: Jul. 14, 2015

(54) METHOD AND DEVICE FOR HARDENING PROFILES

(75) Inventors: Gerhard Lengauer, Bad Zell (AT);
Andreas Schieder, Lengenfeld (AT);
Alfred Habacht, Gaindorf (AT);
Wolfgang Buhl, Mautern (AT); Franz Weitz, Krems-Stein (AT); Andreas Kreuzhuber, Hadersdorf (AT);
Bernhard Lagler, Kottes (AT); Werner Brandstätter, Sankt Andrä (AT)

(73) Assignee: VOESTALPINE KREMS GMBH, Krems (AT)

( * ) Notice: Subject to any disclaimer, the term of this patent is extended or adjusted under 35 U.S.C. 154(b) by 948 days.

(21) Appl. No.: 12/677,784

(22) PCT Filed: Jul. 28, 2008

(86) PCT No.: PCT/EP2008/006214
§ 371 (c)(1),
(2), (4) Date: Oct. 4, 2010

(87) PCT Pub. No.: WO2009/033527
PCT Pub. Date: Mar. 19, 2009

(65) Prior Publication Data
US 2011/0011499 A1    Jan. 20, 2011

(30) Foreign Application Priority Data

Sep. 11, 2007  (DE) .................. 10 2007 043 154

(51) Int. Cl.
*C21D 1/00*  (2006.01)
*C21D 1/10*  (2006.01)
(Continued)

(52) U.S. Cl.
CPC .. *C21D 1/10* (2013.01); *C21D 1/42* (2013.01); *C21D 9/0068* (2013.01)

(58) Field of Classification Search
CPC ........... C21D 1/10; C21D 1/42; C21D 9/0068
USPC ................... 148/526, 320, 567, 559; 266/160
See application file for complete search history.

(56) References Cited

U.S. PATENT DOCUMENTS

| 4,482,793 A | 11/1984 | Lewis |
| 2005/0006828 A1 | 1/2005 | Streubel |

FOREIGN PATENT DOCUMENTS

| DE | 2162718 B | 6/1973 |
| DE | 19640568 A1 | 4/1998 |

(Continued)

OTHER PUBLICATIONS

Notification of Transmittal of Translation of the International Preliminary Report on Patentability from the International Bureau of WIPO, dated Jun. 10, 2010.

(Continued)

*Primary Examiner* — Kaj K Olsen
*Assistant Examiner* — Alexander Polyansky

(57) ABSTRACT

The invention relates to a method for producing hardened profiles, in particular hardened open profiles, wherein the component is at least partly heated to above the austenitizing temperature of the base material and after heating the component is cooled at a rate above the critical hardening rate, the energy necessary for the heating being introduced at least partly by induction, wherein free edges are provided in the component to adjust a temperature or hardness gradient over the cross section of the component, the size, type and extension of the edges being set for a desired degree of hardness and/or hardness gradient.

9 Claims, 23 Drawing Sheets

(51) Int. Cl.
*C21D 1/42* (2006.01)
*C21D 9/00* (2006.01)
*C22C 38/00* (2006.01)

(56) References Cited

FOREIGN PATENT DOCUMENTS

| DE | 19743802 C2 | 9/2000 |
|---|---|---|
| DE | 10033493 C2 | 6/2002 |
| DE | 10120063 A1 | 11/2002 |
| DE | 10246614 A1 | 4/2004 |
| DE | 10254695 B3 | 4/2004 |
| DE | 102004046119 A1 | 4/2006 |
| EP | 1702993 A | 9/2006 |
| JP | 4341515 | 11/1992 |
| JP | 11021619 A | 1/1999 |
| JP | 2002020854 | 1/2002 |
| JP | 2005330504 | 12/2005 |
| WO | 2005021820 A | 3/2005 |

OTHER PUBLICATIONS

Notification of Transmittal of the International Search Report and Written Opinion in the European Patent Office, dated Nov. 6, 2008.
Wallentowitz, Henning, et al. "Development of a Body Floor Structure in Steel Lightweight Design with Improved Side-Impact-Performance," Institut fur Krafffahwesen Aachen (ika), 2005, (Abstract) 6 pages, Germany.
Valery I. Rudnev et al., "Induction Heat Treating Keyways and Holes," Met Heat Treat, Mar. 1996, pp. 83-86, vol. 3 No. 2, U.S.A.

METHOD AND DEVICE FOR HARDENING PROFILES

FIELD OF THE INVENTION

The invention relates to a method and device for hardening profiles, and in particular to hardening roll-formed open profiles.

BACKGROUND OF THE INVENTION

From DE 101 20 063 A1, a method is known for producing metallic profile components for motor vehicles, wherein a starting material provided in the form of a strip is fed to a roll-forming unit and is shaped into a rolled profile. Prior to or subsequent to passing through a roll-forming unit, the starting material or the rolled profile is inductively heated to a temperature required for hardening and then quenched by a cooling unit and hardened. The rolled profile is fed via a downstream calibration unit to a cutting unit which cuts the rolled profile into separate profile components.

A method for producing a metallic shaped component in which a semi-finished product of an unhardened hot-formable steel sheet is shaped into a component blank by means of a cold-forming method is known from DE 102 54 695 B3. At its edges, the blank is then trimmed to an edge contour corresponding to the component to be produced. Finally, the trimmed component blank is heated and press hardened in a hot-forming tool. Already after hot forming, the component has the desired edge contour, so that a final trimming of the edge of the component can be dispensed with.

From DE 100 33 493 C2, an apparatus for the heat treatment of impact beams for automobiles is known, which comprises a step feeder for guiding a plurality of impact beams thereon and orderly and continuously feeding the impact beams in a predetermined direction, and a conveying unit and a guide unit, both being orderly positioned behind the step feeder, wherein a heat-treating unit is provided, which is used for heating the impact beams using an annular induction coil while guiding the impact beams from the rotating and moving unit to a center of said induction coil so as to allow the impact beams to pass through the center of the induction coil.

From DE 197 43 802 C2, a process for the manufacture of a metallic shaped component is known, wherein the component is formed from a steel with a specified steel alloy and partial areas of the plate are heated to a temperature between 600° C. and 900° C. in a period of less than 30 seconds, and the plate partially thermally treated thereby is shaped in a pressing tool to form the shaped component, and the shaped component is then heat-treated in the pressing tool. Components with bottoms of different hardnesses are to be produced in this way.

A component produced according to the so-called tailored blank process, which has an area formed with a higher strength than an adjacent area, is known from JP 2002020854 A.

A partial heat-treatment for components and a device therefor is known from JP 2005330504 A.

A single-part metal sheet semi-finished product produced by shaping, which has defined zones of different strength, and a method for its production are known from DE 10 2004 046 119 A1. In order to achieve the desired strengths in the defined zones, the defined zones are subjected to heating with subsequent rapid cooling. In order to achieve this high temperature gradient, it is provided that a forming tool is used, and in particular, a cooled roller of a rolling tool.

From U.S. Pat. No. 4,482,793, an apparatus for inductively heating a plurality of identical elongated workpieces is known.

From the published research project P584/July 2005 by the Forschungsvereinigung Stahlanwendung e.V., it is known to incorporate rectangular reinforcing members in the form of elongated columns (FIG. 35) into an open hollow profile with a quadrangular or square cross section.

Moreover, it is known to reinforce beams by applying rectangular reinforcing member (FIG. 36).

Moreover, it is known from the research project P584 by the Forschungsvereinigung Stahlanwendung, page 74, in analogy to the patent specification DE 197 43 802 C2, to harden an elongated hollow profile in certain areas.

Also from the published research project P584 by the Forschungsvereinigung Stahlanwendung, July 2005, page 76, it is known to form an open profile with different wall thicknesses along its length, wherein these different wall thicknesses were achieved by rolling the raw material in a manner flexible with regard to thickness, with transitional areas being formed in this case between thicker and thinner areas (FIG. 38).

In another embodiment according to the state of the art, so-called tailored blanks, in which thickness varies over the cross section because different steel thicknesses or steel grades are laser-welded transversely relative to the profile's longitudinal direction, are being used for forming the hollow profiles (FIGS. 39, 40).

Moreover, it is known (FIGS. 41, 42) to insert inserts inside in areas in which a profile is to be reinforced, and to optionally fasten them in order to reinforce the material in this area.

Furthermore, it is also known (FIGS. 43, 44) to provide inserts on the outside on a corresponding profile, in reversal of the above-mentioned embodiment.

In its various embodiments, the aforementioned prior art has specific drawbacks.

The production of so-called tailored blanks, that is, in particular laser-welded plates, with different material thicknesses or different material grades is disadvantageous in that on the one hand, the welding seam may introduce an undefined area of hardness, and on the other hand, that there are often sudden transitions between the individual areas. In addition, such sheets are rather expensive because they require a complex production process. Moreover, such parts must be handled precisely so that the welding seam is always placed exactly at the correct position during and after roll-profiling.

In the case of profiles that have been thickened by means of inserts on the inside or the outside in areas of higher load, it is also disadvantageous that such a configuration is complex and leads to different response behaviors during a subsequent rolling process. If such a doubling process is carried out after rolling, this is at least rather complex. Moreover, there is once again the drawback that there are rather sudden property transitions.

This also concerns profiles that have been hardened or heat-treated in partial areas along their length.

It is a drawback in the case of flexibly rolled tube profiles that process control is more complex than in the case of tube profiles of the same thickness, because the position of the transitional areas and the thick and thin areas must be axially precisely defined, so that no spatial or local displacements and thus also different response behaviors under strain occur over the entire production process.

When column-shaped or rectangular elements are inserted in hollow profiles, it is disadvantageous that this is extraordinarily complex and expensive, and that it again results in rather sudden transitions in the response behavior.

Moreover, thickened portions in the material and internal attachments increase the weight of the components, which runs contrary to the general principles, in particular in the case of vehicle construction, of building lighter.

The aforementioned sudden transitions in the response behavior in bending tests are disadvantageous because sharp buckling with an abrupt failure often occurs in the case of a crash. Such a failure behavior, which is undesirable, is shown in FIG. 45.

It is an object of the invention to provide a method for producing hardened profiles and in particular of hardened roll formed open profiles which permits providing, in a cost-effective, quick and reliable manner, roll-formed and light profiles with different areas of hardness in which the transitional areas are obtained in a smooth and effective manner.

It is another object to provide a device for carrying out this method which has a simple structure, permits a high throughput and allows a high flexibility with regard to different profile shapes.

SUMMARY OF THE INVENTION

The way according to the invention for producing hardened profiles leads away, in a diametrically opposed direction, from the path for reinforcing the material in areas under particular stress customary to the person skilled in the art. In the case of the invention, the opposite is done in areas that are to be provided with great hardness and stability; less material is provided. This removal of material can be carried out to have the form of holes, elongated holes, beads or free edges or slots produced in any other way. A stabilization is effected by a supposed weakening, so to speak. In addition, reductions in weight can thus be achieved while at the same time increasing stability.

The austenitizing temperature necessary for hardening is achieved in the component by inductive heating. This inductive heating used according to the invention leads to a higher temperature in the area of the edge limiting the site of material removal or hole, so that, given an appropriate process control, precisely these areas are hardened or hardened to a particularly high extent. The distribution of the holes or material cutouts and the corresponding inductive process control allow a very delicate adjustment both of the hardness as well as of the hardness distribution.

The principle of induction heating is based on the fact that an electrically conductive or semi-conductive material introduced into an alternating magnetic field is heated because a current is induced in it in accordance with the transformer principle. This eddy current, which primarily flows in the surface, is short-circuited and converted directly into heat. The magnetic field, which is generated by a special configuration of the frequencies, is generated by an inductor adapted to the zone of the material to be heated.

The depth of the heated layer is determined by the generator frequency. By appropriately selecting the frequency and power, all technical heating processes, from surface hardening of small parts to heating through large forgings, can be realized by means of induction heating. Induction heating is special because of the contactless energy transmission between the inductor and the workpiece. Energy can also be transmitted over a relatively large distance of several centimeters. Thus, the contact-protected insulation of the inductor becomes possible without affecting the heating process. Two frequency ranges, which differ from each other with respect to the application in process engineering and the hardware used, are substantially used for induction heating. Medium-frequency plants are nowadays built for frequencies of 1 to 10 kHz, preferably as static generators. These plants work particularly efficiently when heating rather large workpieces, because in that case, the inductor, which, because of the low operation frequency has many windings, can be connected without an output transformer.

High-frequency plants with operating frequencies of 10 kHz to 6 MHz have the greatest variety of options for application in inductive heating.

Though induction heating entails rather high investment costs, the heating costs are very low at a very high degree of efficiency. A very high energy density with very high maximum temperatures is achieved. One decisive advantage is the flexibility with respect to modifications, in particular modifications of the geometry of the articles to be heated. In particular, induction heating is excellently suited for inline-heating in continuous processes, in particular roll-forming of profiles from plane metal sheet strips.

It is an advantage in the invention that profiled and, in particular, roll-profiled components are created which have a defined buckling and failure behavior with a very high stability, wherein, additionally, these components are lighter compared with components from the prior art. The method according to the invention permits a very delicate adjustment of the hardness distribution, the stability and the buckling behavior of such a component by means of the arrangement of edges on the components.

In order to achieve the effects of the method according to the invention, recesses in the material in any form, for example in the form of round holes, angular holes, elongated holes, slots or the like are incorporated into the material, wherein it can be sufficient to obtain the edges required for the method by indentations being applied in the form of beads or penetrations. An edge that can be used well are the two longitudinal edges limiting the opening of an open profile.

The method according to the invention can be used both for uncoated as well as coated and in particular metal-coated sheet components.

The hardness distribution, stability and weight of the component can be adjusted easily by the arrangement of the recesses and by the energy introduced by induction. A recess arrangement can in this case provide a variation of the number of openings of equal size over the surface, however, differently sized openings can also be disposed in different distributions, for example many holes also of different sizes in an area of a particularly high hardness, so that, for example, small holes fill the interstices between large holes. As was already explained, the holes in this case do not necessarily have to be round. They may also be angular punched-out portions whose limiting wall portions form a type of grid structure, as it were. In this case, the grid structure can be larger in areas to be hardened more than in areas to be hardened less. In that case, less but larger holes, or generally less recessed surface, may be provided towards areas which are to be subjected to hardening to a lesser extent.

BRIEF DESCRIPTION OF THE DRAWINGS

The invention is explained by way of example with reference to a drawing. In the figures.

DETAILED DESCRIPTION OF THE PREFERRED EMBODIMENTS

Figure 1:
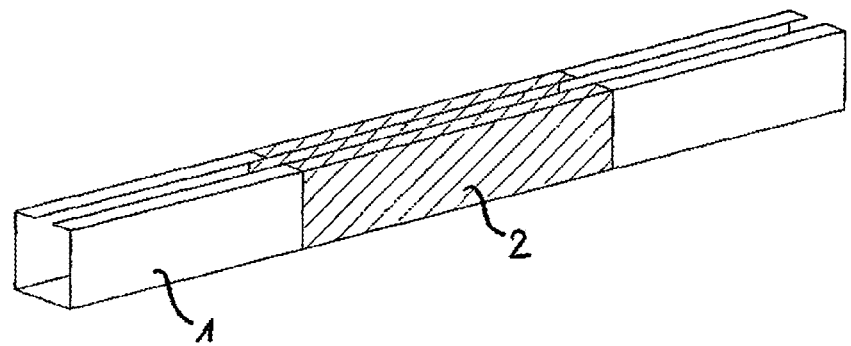
FIG. 1 shows a profile hardened with the method according to the invention, wherein only a certain section of the length is formed to be hardened, and wherein no openings are shown for reasons of clarity.
Figure 2:
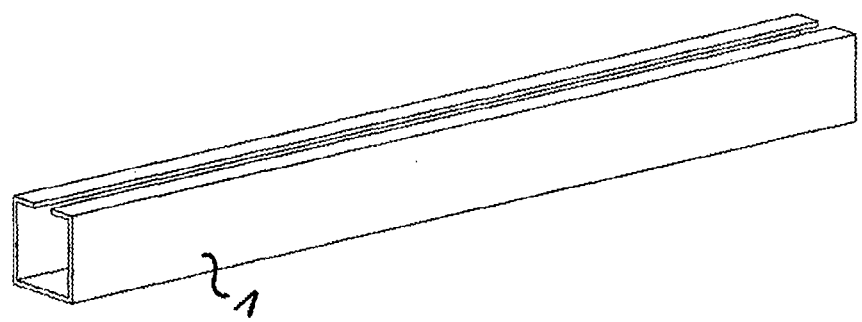
FIG. 2 shows a profile hardened over the entire length of the profile, with no openings being shown.

The method according to the invention provides to first produce profiles 1 from a hardenable steel alloy into an, in particular, open profile cross section 1, for example by means of roll-profiling, and to then harden it. Hardening in at least partial areas of such profiles in this case is generally carried out by eddy currents being induced in the steel material by means of induction, said eddy currents immediately causing the steel material to be heated strongly. In order to effect hardening, this steel material has to be heated by induction at least in partial areas to a temperature above the so-called austenitizing temperature. If such an austenitized steel material is cooled off at a rate above the so-called critical hardening rate, the crystal lattice forms in a special way, or special metal phases, which cause the hardening, form in a special way. In principle, as is also known from the prior art, only certain areas 2 (FIG. 1) or also the entire profile can be hardened (FIG. 2).

Figure 3:
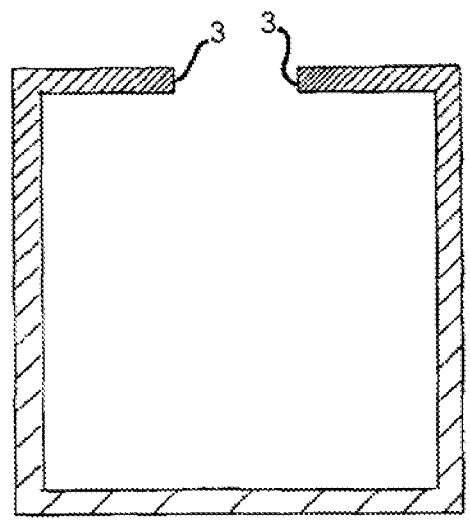
FIG. 3 shows the hardness distribution, starting from an edge limiting an opening, into the material.
Figure 4:
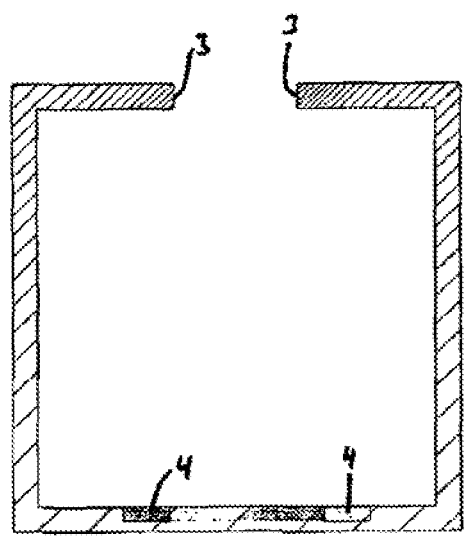
FIG. 4 additionally shows a stamped-out portion with an annular area of high hardness.

During induction, it can be observed that edges 3 heat up considerably faster and also higher than other wall areas of a steel component. The pattern of the heating is shown in FIGS. 3 and 4, wherein stamped-out portions placed all around, areas 4, are produced which are also heated up particularly highly and quickly. In the case of the heat distribution shown in FIGS. 3 and 4, it is to be expected that a similar distribution of the material hardness arises during hardening.

On the one hand, the absolute temperature of the steel material is important for the hardness to be obtained, on the other hand, however, also the time for which the steel material is at the austenitizing temperature, because the conversion processes require a certain time.

Accordingly, with the patterns of temperature shown, a corresponding hardness distribution can also be achieved, because the particularly highly heated areas presumably are also at a temperature above the austenitizing temperature for a longer period of time, whereas the other areas do not reach this temperature until later, thus leaving less time for conversions.

Of course, the process can be carried out in such a way that a hardening is obtained in the edge areas, but that the hardening temperature, at a certain distance therefrom, is not exceeded, or at least not exceeded sufficiently long for an actual hardening to take place.

Thus, using edges 3 on the one hand and the strength and duration of the induction on the other, it can be determined whether a component is hardened completely or partially or to different strengths over the cross section.

Figure 5:
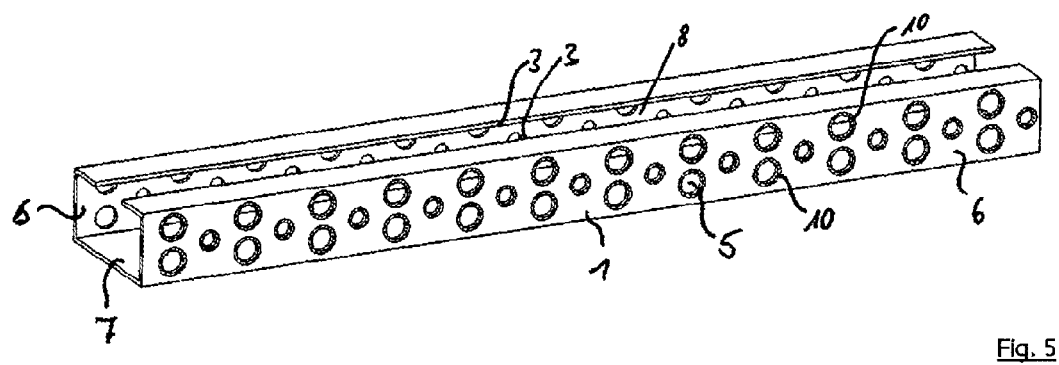
FIG. 5 shows, in a very schematic view, a possible hardness distribution in the side walls of a profile component with areas of high hardness located thereabout.
Figure 6:
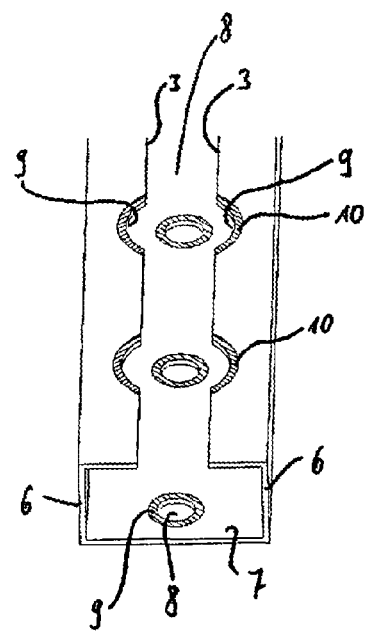
FIG. 6 shows another possible embodiment in which openings are disposed in the area of the bottom, and wherein, additionally, recesses with a longitudinal slot are provided, with the areas of highest hardness being represented in a hatched manner.

In addition to the edges 3 shown in the FIGS. 3 and 4, the FIGS. 5 and 6 show a plurality of hardening recesses 5 placed in side walls 6 or bottom walls 7 of a profile component.

In this case, the edges 3 limit an axially extending opening 8 of a common open profile 1, whereas the openings 5 are arranged distributed in the walls. The openings 5 in side walls 6 (FIG. 5) or openings 8 in bottom walls 7 (FIG. 6) can be, for example, circular holes. Of course, these openings can also be configured to be angular, such as triangular, quadrangular or polygonal, such as hexagonal or octagonal. In addition, the recesses 5, 8 can also be formed slot-shaped or as elongated holes. The geometric shape of the recesses 5, 8 does not play such a decisive role. However, with a well-designed configuration of the holes and of the distribution of the holes, a large amount of weight can be saved, with an extremely high bearing capacity of the component. It is possible, for example, using triangular recesses of different sized (not shown), with, for example, four triangular recesses each pointing with a tip towards a common point, to achieve a grid structure in walls of the component, with the grid webs being particularly strongly and well heated by the induction (depending on the distance of the recesses to one another), and then to form particularly hard areas.

In order to enlarge hardened areas of the longitudinal edges 3 or to multiply the length of the edges 3 and thus the highly hardenable areas, semicircular or other recesses 9 can also be provided in the longitudinal edges 3, which also make adjacent hardening zones possible. The hardening zones are represented in a hatched manner in the FIGS. 5 and 6 and are provided with the reference numeral 10.

The width of the hardening zone shown of course varies in this case, depending on duration and strength of the inductive heating.

Figure 7:
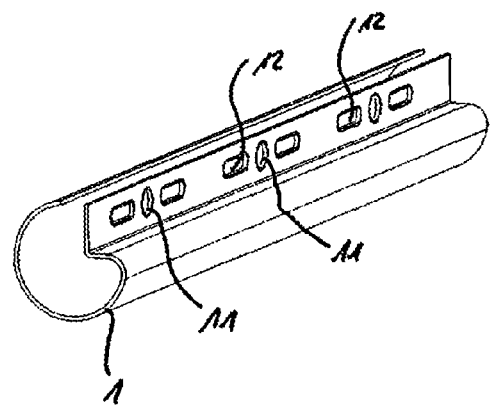
FIG. 7 shows another embodiment with a possible recess arrangement.
Figure 8:
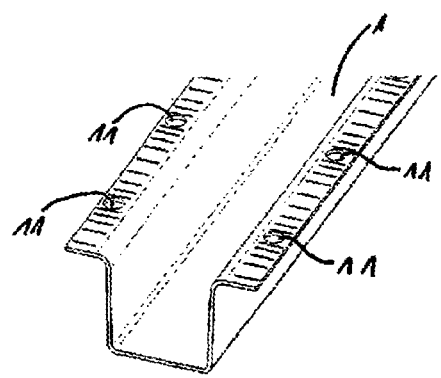
FIG. 8 shows another profile with a possible recess arrangement and a drawn-in hardness distribution.
Figure 9:
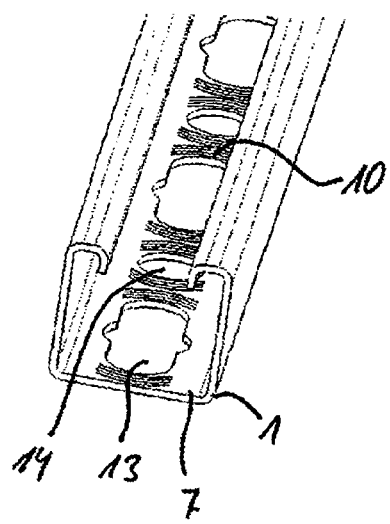
FIG. 9 shows another recess arrangement in a profile component with hardness distributions drawn in schematically.

Such recesses are to be disposed, in particular, also as recesses 11 or recesses 12 of elongated-hole-shape (FIGS. 7 and 8), in particular in flange-shaped connecting areas of profiles to be hardened.

Figure 10:
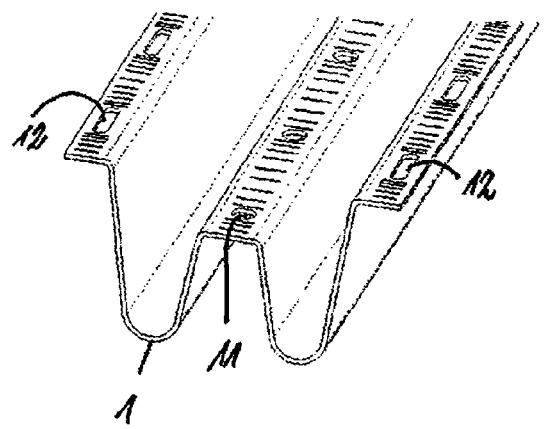
FIG. 10 shows another profile with a possible recess arrangement, in particular in the connecting area of the profile.
Figure 11:
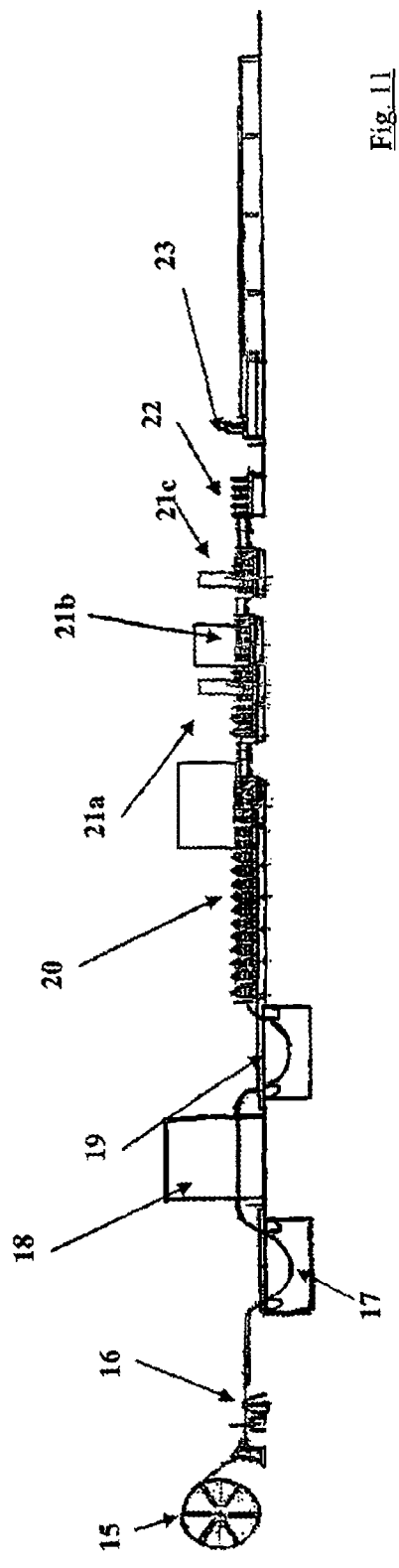
FIG. 11 shows a process flow according to the invention in a very schematic view.

Corresponding hardness distribution can also be adjusted in these cases (FIGS. 7, 8 and 10), wherein the recesses can also have dimensions that are considerable, for example recesses 13 having a width corresponding to more than half of the width of a bottom wall 7 of a profile 1. In this case, larger recesses 13 and smaller recesses 14 can alternate in order to influence the hardness distributions or temperature patterns 10.

A device according to the invention for carrying out the method comprises a strip accumulator 15 in which a wound-up steel sheet strip is located, which can be uncoated or configured with a metal coating, in particular a zinc coating. In order to ensure a continuous process, a weld-on device 16, in which the beginning of a new strip is welded to the end of an old strip, is located behind the strip accumulator 15, in which the strip is pulled off from a strip reel. The strip then runs into a forward punching machine 18 in which the desired openings and holes, but also, in part, edge contours, are punched into the strip, with a looping pit 17 being located forward of the forward punching machine 18 and a looping pit 19 behind the forward punching machine 18. Different strip speeds and, if required, a stop of the strip and the stopping times during welding are compensated by means of such looping pits, into which the strip is conveyed in the form of a loop.

After the looping pit 19, the strip arrives in the profiling machine, in which the strip is gradually profiled to the desired form by means of rolls. The profiling machine 20 is followed by the hardening device 21. In the hardening device 21, the inductive and/or conductive heating of the profile 1 is carried out in a heating device 21a, and then a cooling process in a cooling device 21b, and thus hardening, wherein the heating can act on the profile 1 both partially as well as over its entire area. In the cooling device 21b of the hardening device 21, the heated profile 1 is cooled by means of air, other gases or water or other cooling liquids at a rate above the critical hardening rate. In the hardening apparatus 21, a tempering step in a tempering device 21c may also be provided after cooling in order to compensate the tensions created during hardening and thus to achieve an increased ductility of the material (and an improved harmonic bending failure), which cuts off the appropriate length.

In another advantageous embodiment (FIG. 12), a galvannealing unit 24 is provided between the weld-on part 16 and the first looping pit 17. It is task of the galvannealing unit 24 to convert a zinc layer on the steel strip by heating to 500° to 700° C. into an alloyed zinc-iron layer, with galvannealing layers being known in principle. The galvannealing device 24 can also be disposed between the second looping pit 19 and the roll-profiling machine 20 or between the roll-profiling machine 20 and the hardening device 21.

Figure 13:
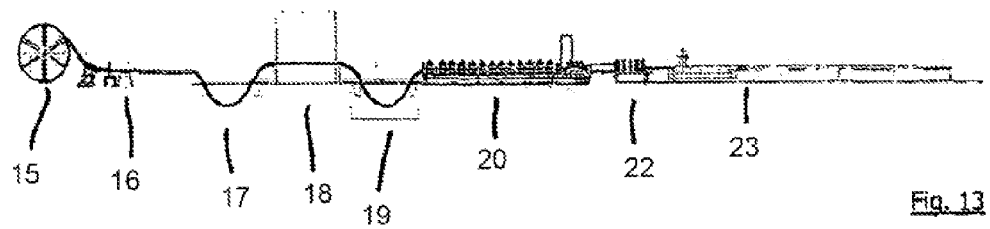
FIGS. 13 and 14 show another embodiment of a process flow according to the invention, in which a cutting step and a separation and storage are inserted.
Figure 14:
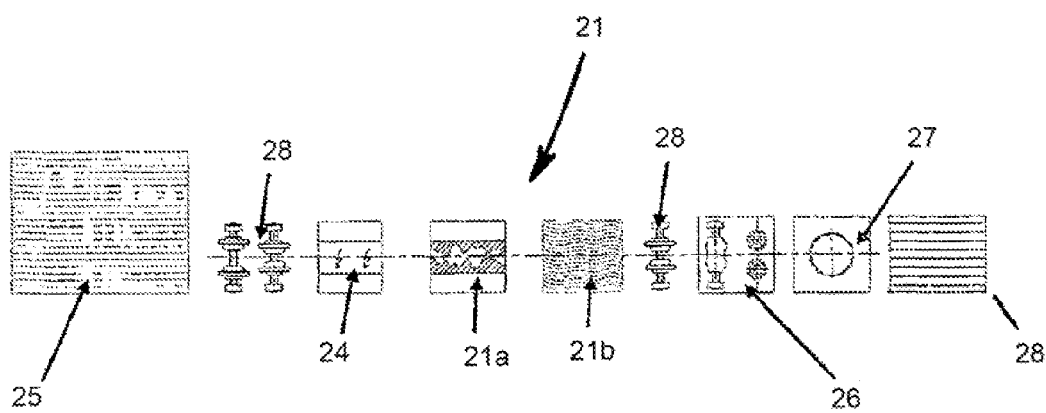

In another advantageous embodiment (FIGS. 13 and 14), the profiles are produced in a roll-forming plant and a partial or complete hardening/tempering process of the profiles 1 is carried out in a run-through device with inductive and/or conductive heating and cooling driven by feed rollers. In this device, identical elements are provided with identical reference numerals. In this apparatus according to the invention, punching in the forward punching machine 18 and roll-profiling in the roll-profiling unit 20 is completed first, then the profiles 1 are cut to the appropriate dimension, whereby mechanical pre-processing is completed (FIG. 13). The cut profiles are retained in a storage means 25 and fed by means of feed rollers 28 to a galvannealing stage 24 first, then arrive in a hardening device 21, in which the heating required for hardening is carried out in a device 21a, and in which, in a unit 21b, a cooling process and, optionally, a re-heating process is carried out for the purpose of tempering. The hardened profile is subsequently fed with feed rollers to a straightening frame 26 and, if necessary, recalibrated, with cutting steps which are possibly necessary being subsequently carried out in a cutting unit 27, in which the offcut is also discarded. Finally, the finished components arrive in a final storing means 28. Such a device shown in FIGS. 13, 14 is advantageous in particular in a case where an existing roll-profiling plant (FIG. 13) is supposed to be supplemented with a possible hardening according to the invention.

Figure 12:
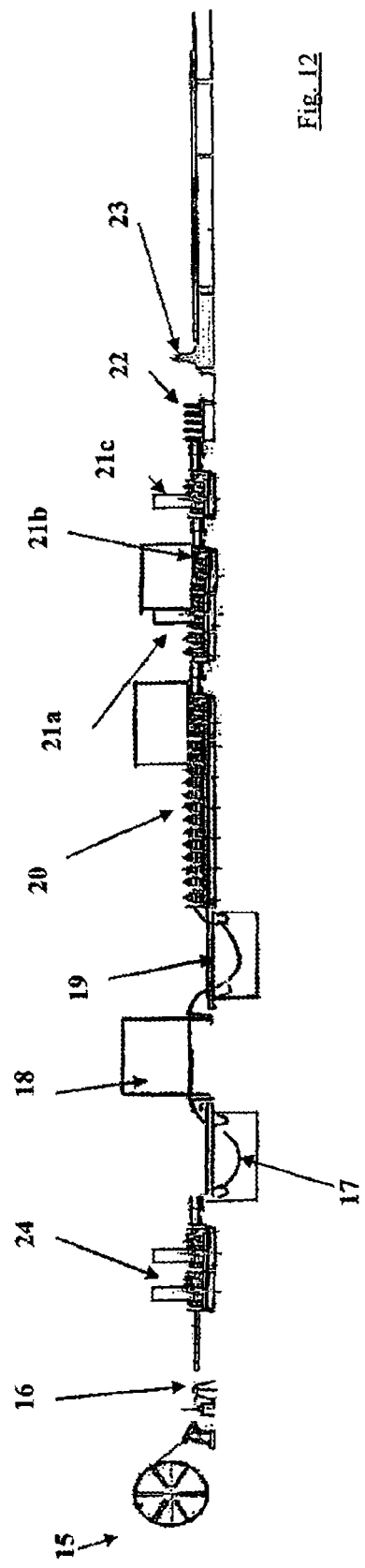
FIG. 12 shows another embodiment of a process flow according to the invention for galvanized sheets for obtaining an alloy.
Figure 15:
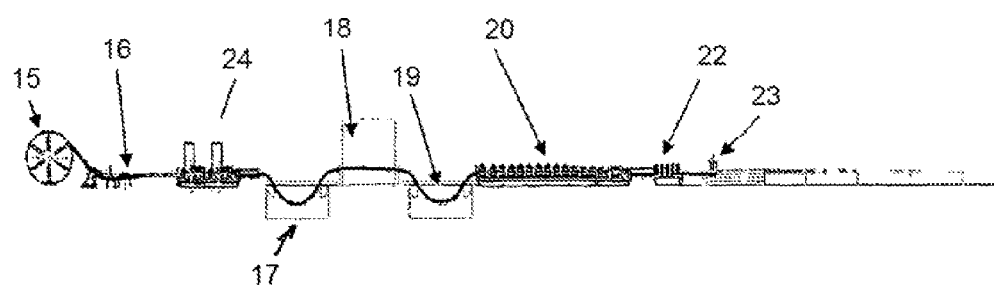
FIG. 15 shows another embodiment of the device according to FIGS. 13 and 14, wherein cut profiles are being produced.
Figure 16:
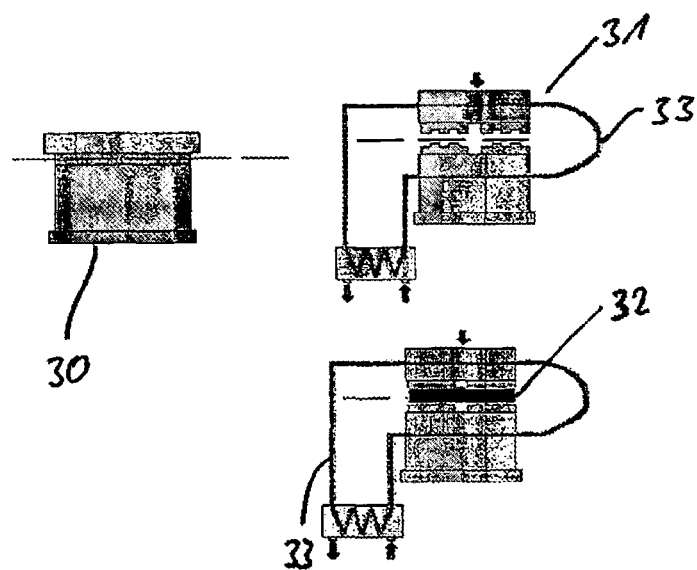
FIG. 16 shows a very schematic view of a furnace and other shaping tools for processing the cut profile units produced in a plant according to FIG. 15 with cooling and/or heating and cooling within one tool.

In another advantageous embodiment (FIGS. 15, 16), a device according to FIG. 12 is used, so that identical parts are also provided with identical reference numerals also in this case, wherein the cut profiles 1 are subsequently heated in a furnace 30 and then rapidly cooled in a cooling tool 31, optionally in a positive fit with the tool. In another advantageous embodiment also shown in FIG. 16, both heating as well as cooling takes place in the tool, with heating of the workpiece 32 taking place by means of, for example, inductive heating, and cooling subsequently taking place in the same tool by means of a cooling circuit 33.

In order to achieve a specific hardening and, in particular, a specific hardness distribution over the cross section and not only over the length of the workpiece, different devices for introducing the energy into the workpiece are provided according to the invention.

In this case, heat can be transmitted both conductively as well as inductively, and, as was already explained, it is necessary for the energy to be introduced in an inline process over a cross section or at specific locations to produce edges at which the inductive introduction of heat can take place so as to be particularly fast and high.

Figures 17, 18:
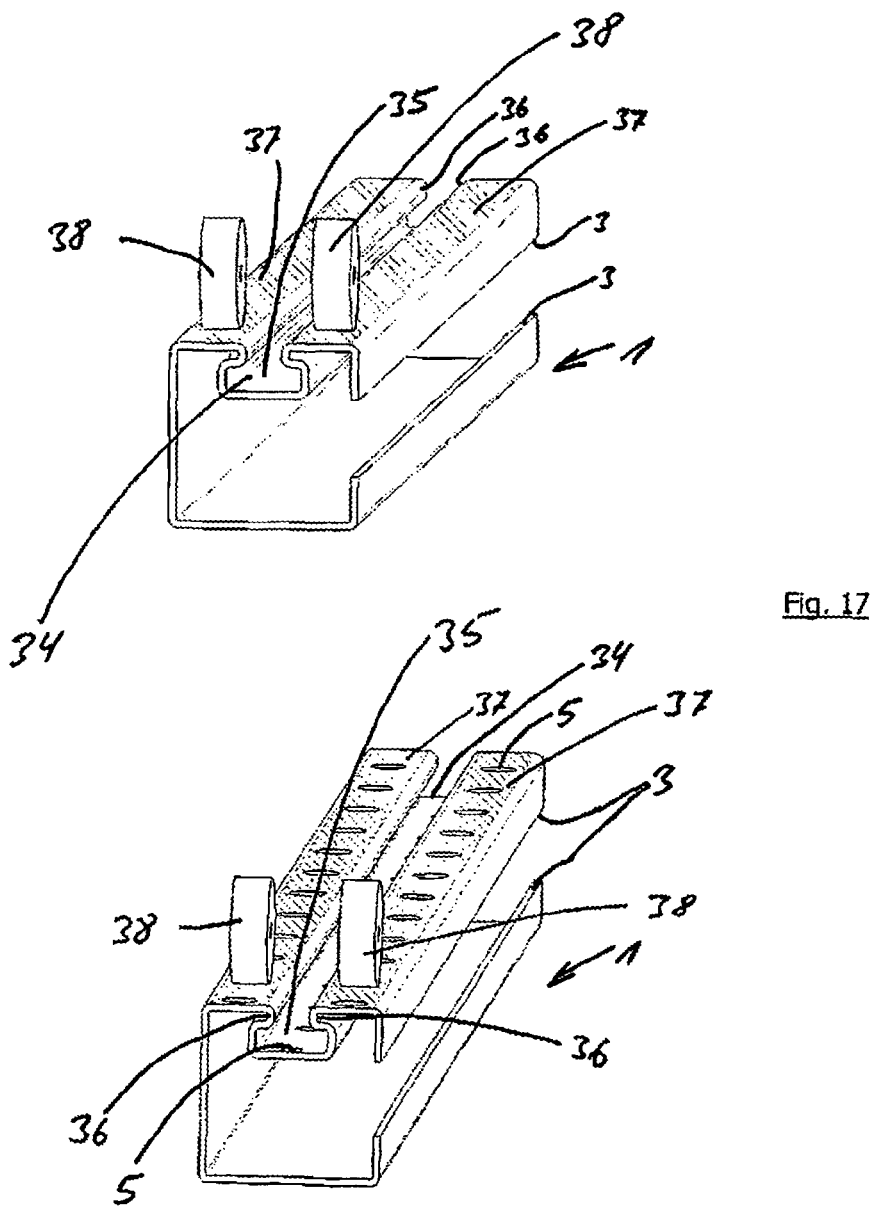
FIG. 17 shows a first embodiment of conductors acting on the side surfaces of a profile.
FIG. 18 shows another embodiment, with hardening recesses being provided additionally.

Such edges can also be produced by a sunk groove 35 with edges 36 that are drawn-in at the top (FIG. 17) being formed during roll-profiling, with conductors or inductors 38 acting in neighboring wall areas 37 and introducing heat into these areas 37, which then gradually decreases over the cross section of the profile 1.

In another advantageous embodiment, additional recesses 5 for forming further edges for fast heating are provided in those areas 37 comprising the conductors or inductors 38. In this case, heating then takes place on the drawn-in edges 36 of the groove 35 and in the area of the edges of the holes 5, wherein holes 5 may be additionally provided in the bottom of the groove 35.

Figure 19:
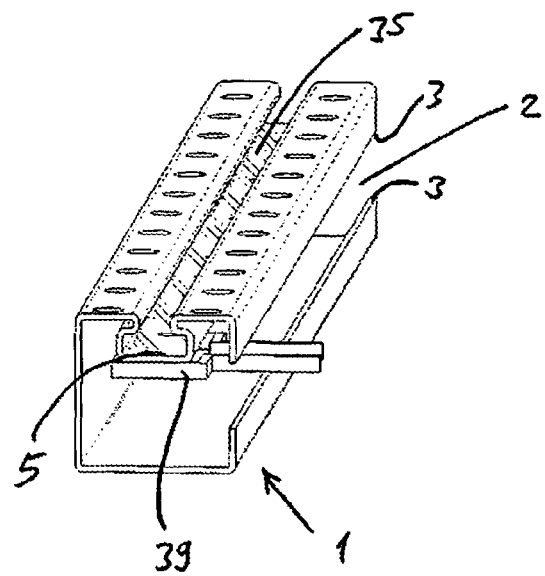
FIG. 19 shows another embodiment of an inductor for inducing inside of an open profile.
Figure 20:
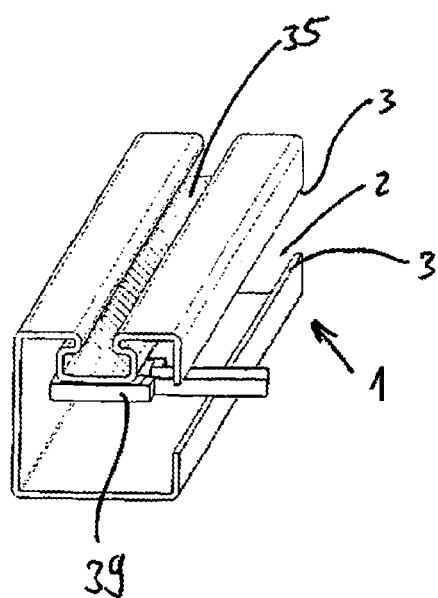
FIG. 20 shows another possible embodiment according to FIG. 19 without hardening openings.

In another advantageous embodiment (FIGS. 19, 20), an induction coil 39 extends through a longitudinal-slot-shaped opening 2 of an open profile 1, said opening being limited by edges 3, and in this case acts on the groove bottom 35 already described or on holes 5 provided there.

Figure 21:
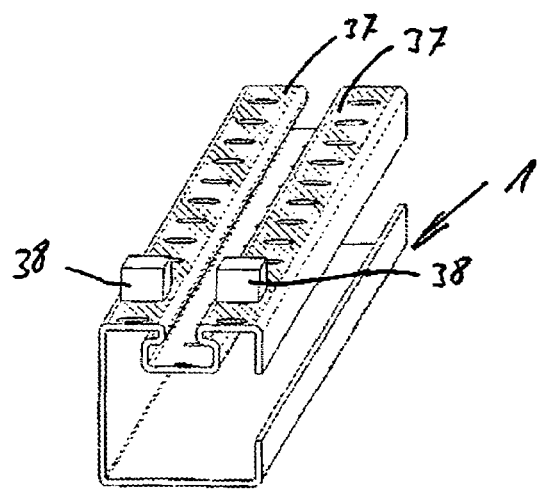
FIG. 21 shows another possible embodiment of conductors.
Figure 22:
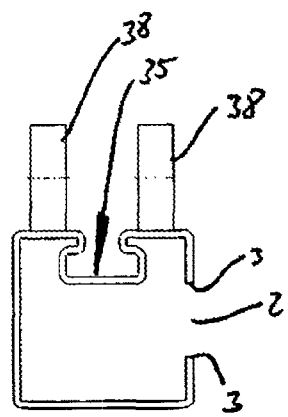
FIG. 22 shows the conductors according to FIG. 17 in a cross section.
Figure 23:
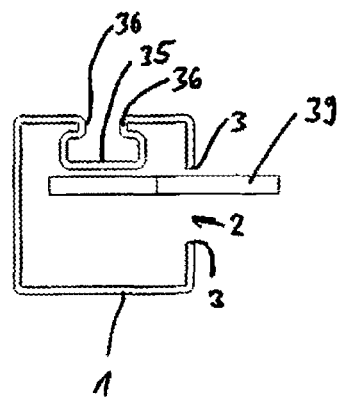
FIG. 23 shows the inductors according to FIGS. 19 and 20 in a cross section.
Figure 24:
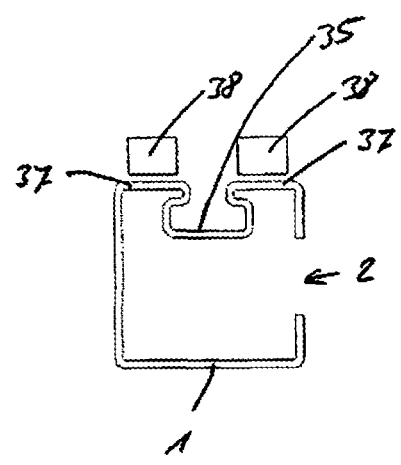
FIG. 24 shows the inductors according to FIG. 21 in a cross section.
Figure 25:
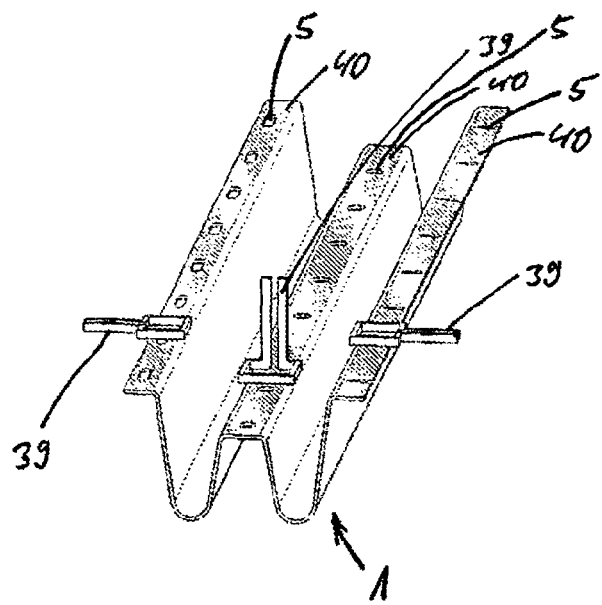
FIG. 25 shows the arrangement of inductors in a profile according to FIG. 10.
Figure 26:
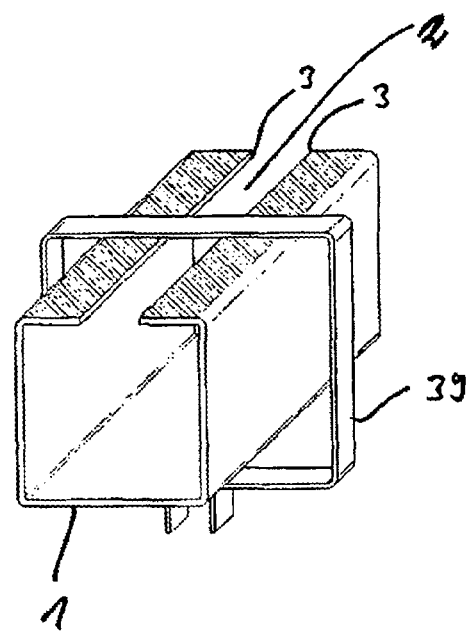
FIG. 26 shows another possible embodiment of an annular inductor.

Additionally or simultaneously, conductors (FIG. 21) may act on the areas 37 of the profile 1.

Figure 27:
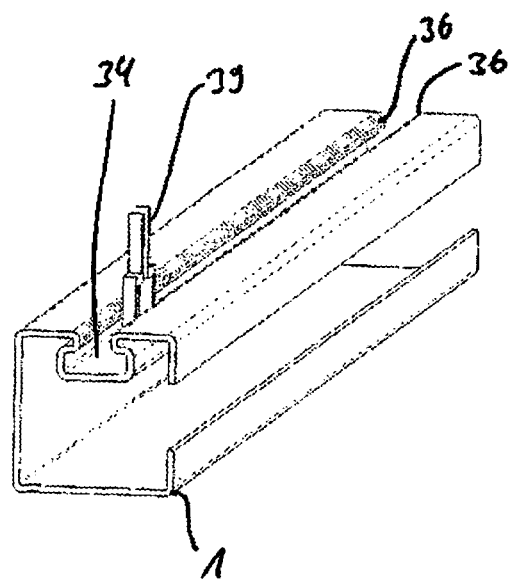
FIG. 27 shows another possible embodiment of an inductor dipping into an indentation.

Moreover, it is also possible to let a plurality of inductors 39 act on specific areas 40 of a component 1 (FIGS. 25, 27, 28, 29, 31, 32), wherein these special areas 40 are, for example, flange or connecting areas of an open profile 1, wherein these flange or connecting areas 40 of the open profile 1 comprise, in particular, holes 5, wherein the holes 5 contribute both to attaching the component to other components and to the effect of edge heating already described. Moreover, edges 36 limiting a groove 34 may also be specifically heated, with the inductor 39 in the process dipping into the groove 34 and acting on the edges 36 (FIG. 27).

In the simplest case, an annular inductor 39 is provided through which the profile 1 is guided, in particular an open profile cross section 1 with a longitudinally extending profile opening 2 provided in a wall of the profile 1 and limited by edges 3. In this case, the effect of a stronger and faster heating of the edges 3 is prominent compared with the rest of the component 1, with the heat distribution and thus the hardness distribution after hardening becoming weaker starting from the edges 3 towards the outside. Thus, a desired hardness distribution over the cross section of the profile 1 can be ensured also by means of the specific orientation of a single longitudinal opening 2 in the open profile 1.

Figure 28:
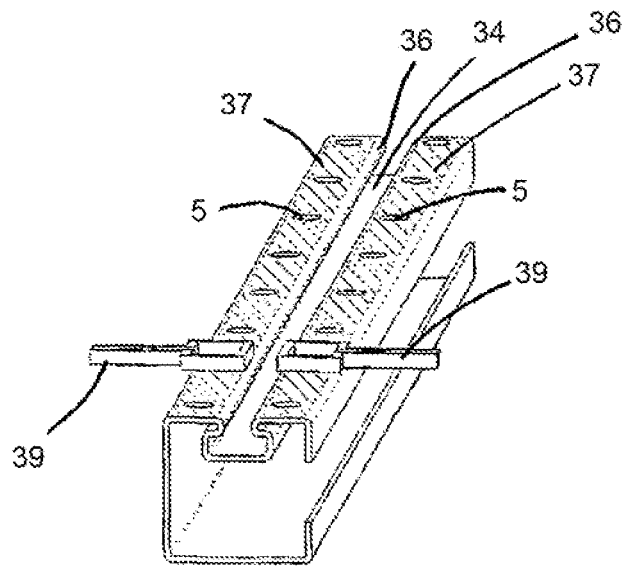
FIG. 28 shows another possible embodiment of inductors for a profile.
Figure 29:
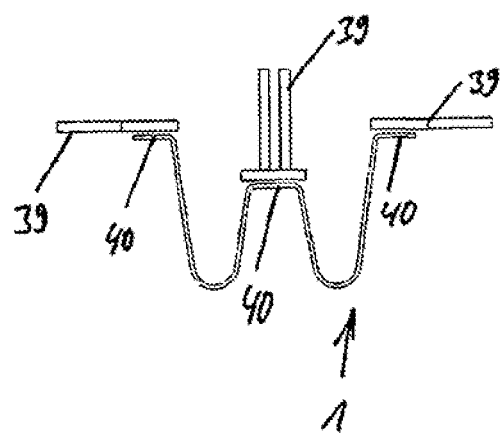
FIG. 29 shows inductors according to FIG. 25 in a side view.
Figure 30:
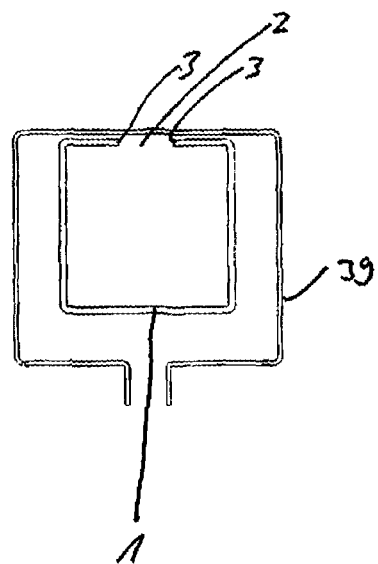
FIG. 30 shows a possible annular inductor in a sectional view.
Figure 31:
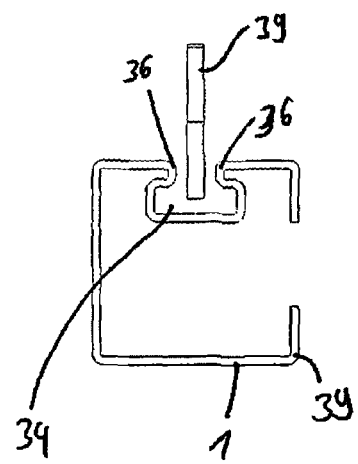
FIG. 31 shows an inductor arrangement according to FIG. 27 in a side view.
Figure 32:
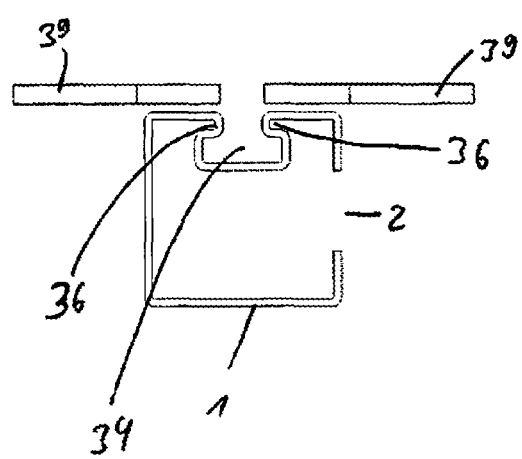
FIG. 32 shows the arrangement of inductors according to FIG. 28 in a side view.
Figure 33:
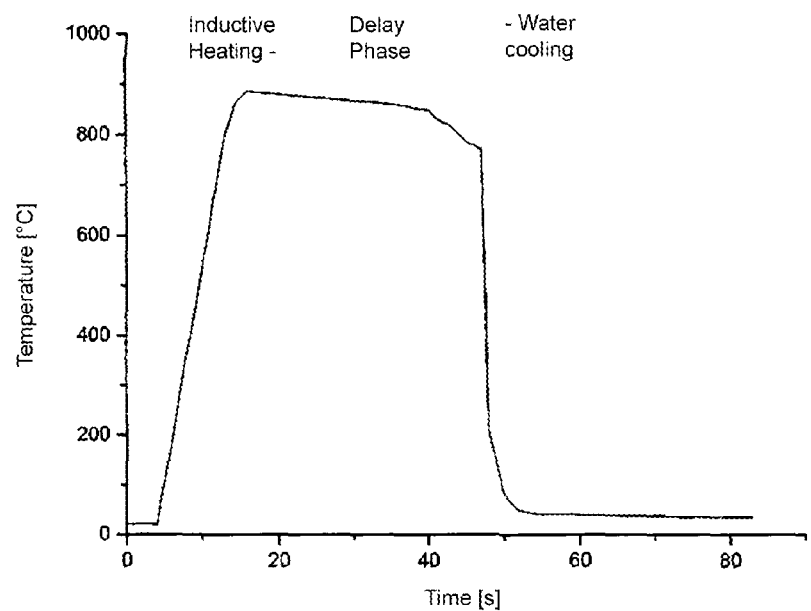
FIG. 33 shows a temperature curve during hardening in accordance with the method according to the invention.
Figure 34:
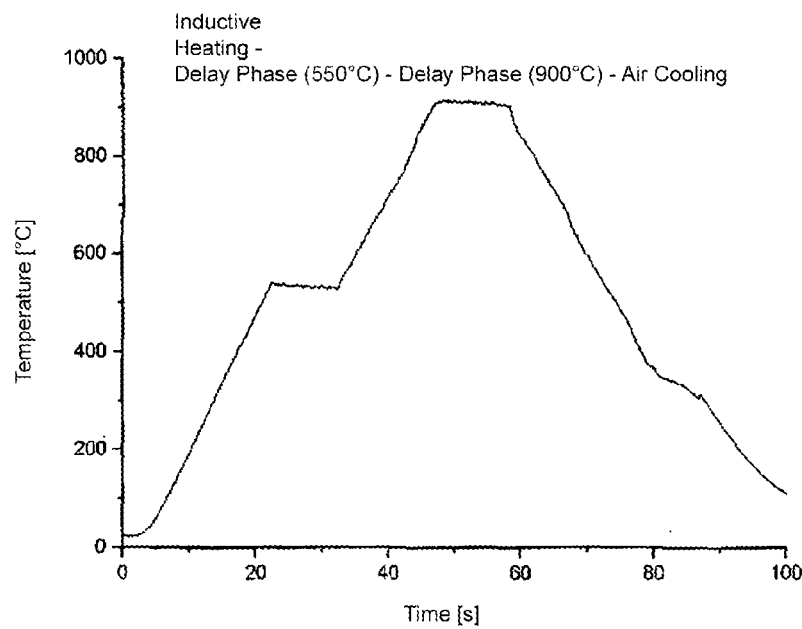
FIG. 34 shows another temperature curve during hardening according to the method according to the invention, with an intermediate delay phase for forming a zinc-iron coating from a zinc coating.
Figure 35:
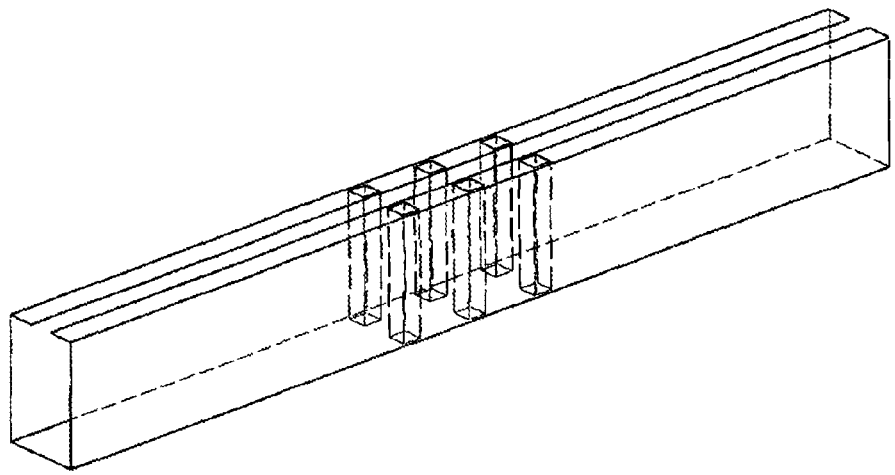
FIG. 35 shows columns inserted into a beam for increasing stability according to the prior art.
Figure 36:
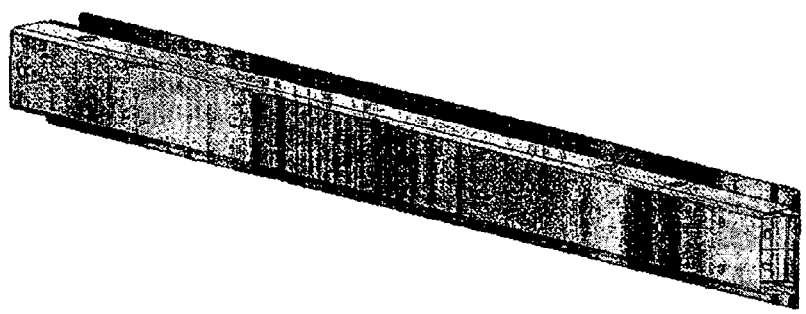
FIG. 36 shows reinforcement of a beam with a rectangular profile according to the prior art.
Figure 37:
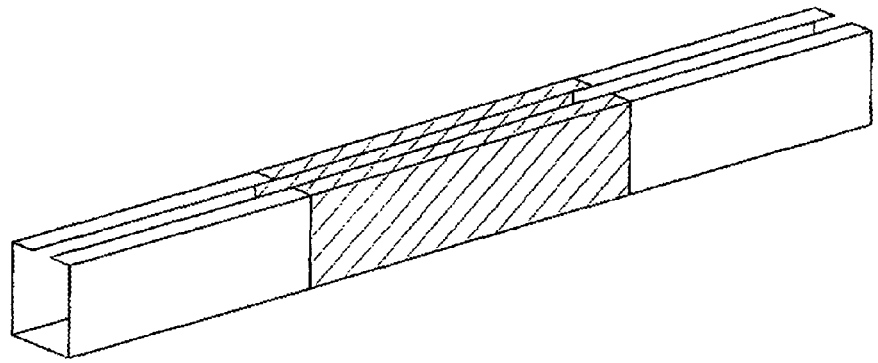
FIG. 37 shows complete hardening of a partial section of a length of the profile according to the prior art.
Figure 38:
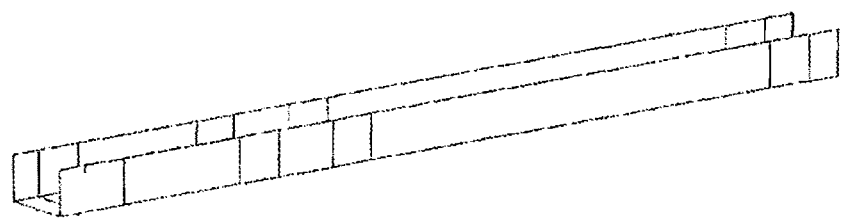
FIG. 38 shows a profile produced by flexible rolling with different thickness zones.
Figure 39:
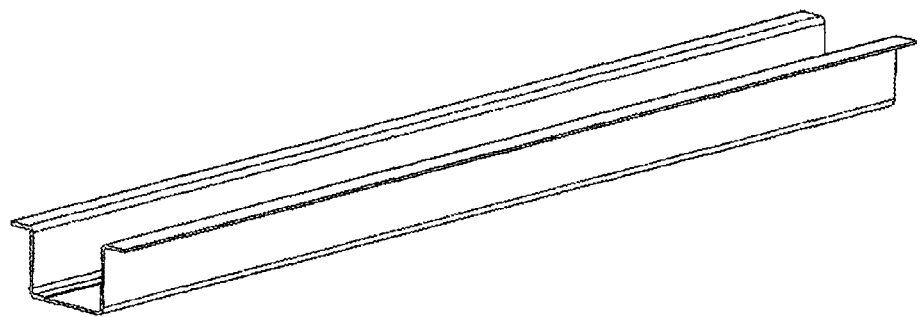
FIG. 39 shows a profile with different materials and/or material thicknesses according to the prior art.
Figure 40:
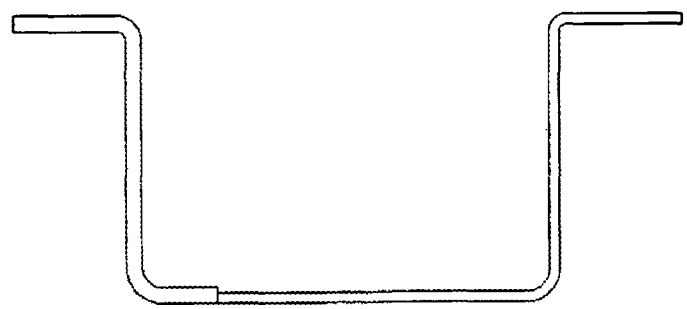
FIG. 40 shows the profile according to FIG. 39 in a cross section, showing two different material thicknesses.
Figure 41:
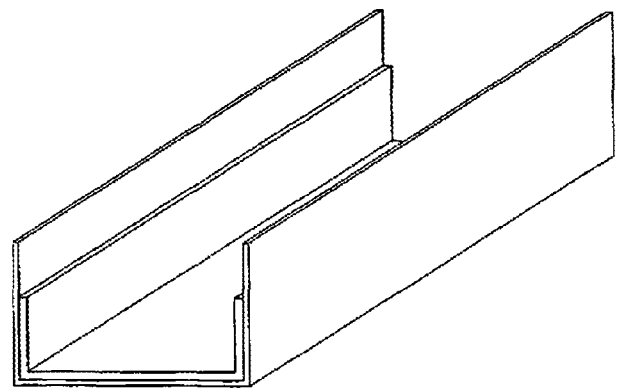
FIGS. 41 and 42 show inserts on the inside for increasing the stability of a profile.
Figure 42:
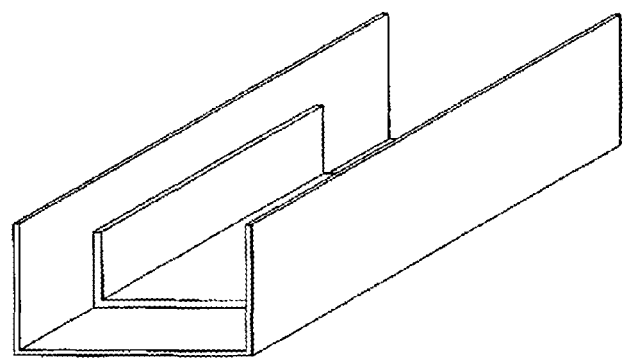
Figure 43:
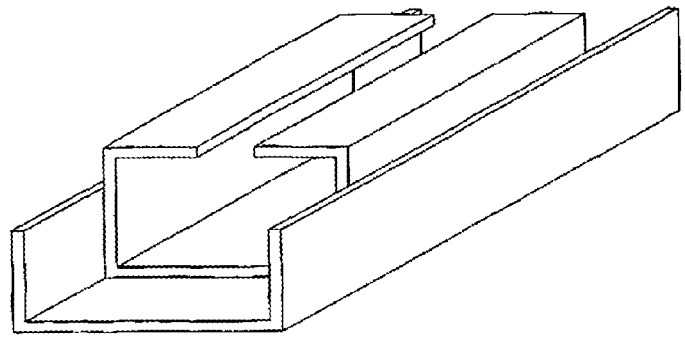
FIGS. 43 and 44 show inserts on the outside for increasing the stability of a beam located on the inside.
Figure 44:
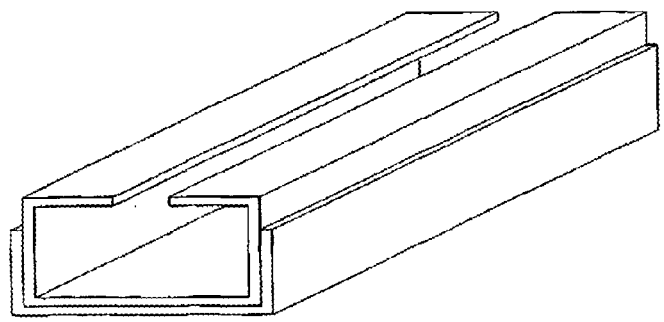
Figure 45:
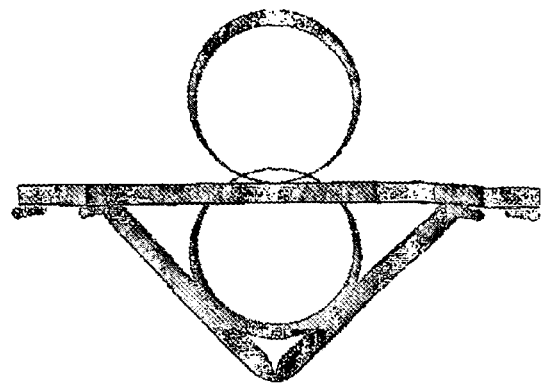
FIG. 45 shows buckling, inharmonic failure of a beam according to the prior art.

Inductors 39 can also be guided over surfaces 37 with holes 5, with the surfaces 37 limiting a groove 34, for example, with edges 36. If in this case holes 35 are also provided in the surfaces 37, a fast heating and specific hardening can take place in the areas of the holes (FIGS. 28 and 32).

What is advantageous with regard to the invention is that the effects of faster and stronger heating in the area of the edges occurring on the edges in a metallic component in the case of induction can be specifically used for adjusting a hardness gradient over the cross section and over the length of the inline-produced profile. Adjusting the hardness over the length was already known, but not the adjusting of hardness gradients over the length; for the first time, adjusting the hardness over the cross section is now possible.

In this case, the hardness distribution can be very delicately adjusted over produced edges, for example edges of a shaped-in groove, in particular drawn-in edges of a shaped-in groove, edges of penetrations or indented beads, limiting edges of holes and slots and the like.

The hardness gradient can in this case be adjusted both by the duration of action of the induction as well as by the energy introduced or strength of the induction, the retention time, i.e. the strip speed, and the hole distribution, hole size and hole type.

Advantageously, the holes can also be disposed distributed in such a way that a more or less grid-like structure of the component is formed.

It is an additional advantage of the creation, according to the invention, of edges for utilizing the edge effect during induction that the components are lighter than a comparatively completely hardened component, despite a reinforcement or increase of stability.

Figure 46:
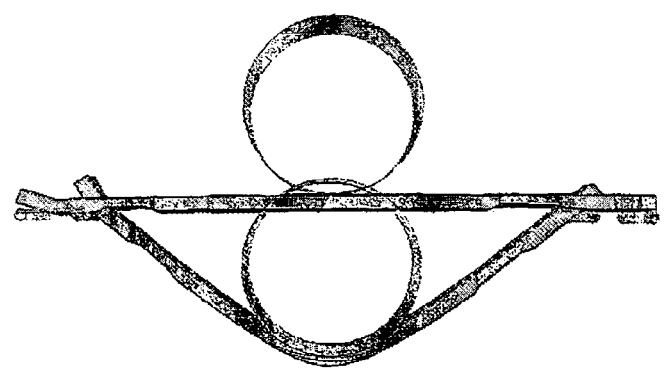
FIG. 46 shows harmonic bending failure of a profile produced according to the method according to the invention.

Because of this adjustment of a hardness gradient in the component, both over the cross section as well as over the length, a very harmonic bending or failure process can be achieved (FIG. 46) in the case of a violent impact upon such a component, which does not exhibit any sharp or sudden buckling or edges.

In addition, the method according to the invention can be carried out simply, quickly and safely.

The invention claimed is:

1. A method for producing hardened open profiles, comprising:
    forming recesses in a component, wherein the recesses are in the form of longitudinal or transversal grooves, holes, round holes, triangular or polygonal holes, slots, indentations, or stamped-through portions, and the recesses have free edges; and configuring the shape, size in terms of area, and distribution of the recesses, including distance between the free edges, to control resulting hardness or hardness gradients;
    heating the component firstly to a temperature below an austenitizing temperature of a basic material of the component using one of conduction, convection, and radiation, and carrying out a subsequent induction heating step to reach the austenitizing temperature along the free edges of the component;
    after heating, cooling the component at a rate above a critical hardening rate to achieve a hardness gradient over a cross section of the component and over an axial section of the component.

2. The method according to claim 1, wherein the material has a first area in which the material is to be hardened to a higher degree than in a second area in which the material is to be subjected to hardening to a lesser degree or to no hardening at all, further comprising configuring the recesses according to size and number by providing a greater number of recesses that are smaller in size in the first area, and providing a smaller number of recesses that are larger in size in the second area.

3. The method according to claim 1, comprising forming the recesses in the basic material of the component as a grid structure.

4. The method according to claim 1, comprising using hot-dip galvanized steel sheet material to form the component.

5. The method according to claim 4, further comprising heating the basic material to a temperature between 500° C.

and 700° C. and keeping the temperature in this range in order to form a zinc-iron alloy on the surface of the component prior to the subsequent induction heating to the austenitizing temperature.

6. The method according to claim 1, comprising cooling at least a partial area of the component that was heated by induction at the rate above the critical hardening rate using a gas stream, a liquid stream, a contact by positive fit with a cold mold, or combinations thereof.

7. The method according to claim 1, wherein during the subsequent induction heating axially guiding the component through an induction coil for transmitting energy using induction.

8. The method according to claim 1, comprising using one or more induction coils to heat partial areas of the component.

9. The method according to claim 1, further comprising tempering the component, after having been cooled at the rate above the critical hardening rate, in order to mitigate tensions introduced during hardening.

\* \* \* \* \*